US00RE50395E

(19) United States
(12) Reissued Patent
Kim et al.

(10) Patent Number: US RE50,395 E
(45) Date of Reissued Patent: Apr. 22, 2025

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Sangwon Kim, Suwon-si (KR); Youngkook Kim, Suwon-si (KR); Jeongryeol Seo, Suwon-si (KR); Hyewon Lee, Suwon-si (KR)

(73) Assignee: SAMSUNG ELECTRONICS CO., LTD., Suwon-si (KR)

(21) Appl. No.: 17/750,154

(22) Filed: May 20, 2022

Related U.S. Patent Documents

Reissue of:
(64) Patent No.: 11,036,455
Issued: Jun. 15, 2021
Appl. No.: 16/393,075
Filed: Apr. 24, 2019

(30) Foreign Application Priority Data

Jun. 14, 2018 (KR) ..... 10-2018-0068066

(51) Int. Cl.
*G06F 3/14* (2006.01)
*G09G 3/32* (2016.01)

(52) U.S. Cl.
CPC ..... *G06F 3/1446* (2013.01); *G09G 3/32* (2013.01); *G09G 2300/026* (2013.01); *G09G 2360/04* (2013.01)

(58) Field of Classification Search
CPC ..... G06F 3/1446
See application file for complete search history.

(56) References Cited

U.S. PATENT DOCUMENTS

| | | | | |
|---|---|---|---|---|
| 5,067,021 | A | 11/1991 | Brody | |
| 6,501,441 | B1 | 12/2002 | Ludtke et al. | |
| 6,999,045 | B2 | 2/2006 | Cok | |
| 9,069,519 | B1 * | 6/2015 | Hall | F21V 31/005 |
| 9,131,268 | B2 | 9/2015 | Min | |
| 9,207,904 | B2 | 12/2015 | Hall | |
| 10,008,175 | B2 | 6/2018 | Nakajima | |
| 10,620,899 | B2 | 4/2020 | Otsuka | |

(Continued)

FOREIGN PATENT DOCUMENTS

| | | | |
|---|---|---|---|
| CN | 102959981 | A | 3/2013 |
| JP | 4-81890 | A | 3/1992 |

(Continued)

OTHER PUBLICATIONS

Communication dated Oct. 8, 2021, issued by the Korean Patent Office in counterpart Korean Application No. 10-2018-0068066.

(Continued)

*Primary Examiner* — Cameron Saadat
(74) *Attorney, Agent, or Firm* — Sughrue Mion, PLLC

(57) ABSTRACT

An electronic apparatus includes an interface connected to a modular display apparatus, and a processor for transmitting an image signal to the modular display apparatus connected through the interface. The processor divides a plurality of display modules included in the modular display apparatus into a plurality of groups based on a vertical direction, divides the image signal into a plurality of image signals corresponding to the plurality of groups, and transmits the divided plurality of image signals to the plurality of groups.

20 Claims, 9 Drawing Sheets

(56) References Cited

U.S. PATENT DOCUMENTS

| | | | | |
|---|---|---|---|---|
| 2004/0061661 | A1 | 4/2004 | Kishita et al. | |
| 2005/0134525 | A1 | 6/2005 | Tanghe et al. | |
| 2005/0134526 | A1 | 6/2005 | Willem et al. | |
| 2008/0018554 | A1 | 1/2008 | Odagawa | |
| 2009/0096711 | A1* | 4/2009 | Jang | G06F 3/1446 345/1.3 |
| 2010/0128020 | A1* | 5/2010 | Oh | G06F 3/1446 345/213 |
| 2013/0038508 | A1 | 2/2013 | Min | |
| 2013/0246576 | A1* | 9/2013 | Wogsberg | H04N 7/181 709/219 |
| 2013/0271973 | A1* | 10/2013 | Rycyna, III | F21V 19/00 362/231 |
| 2014/0078685 | A1 | 3/2014 | Lee et al. | |
| 2014/0111530 | A1 | 4/2014 | Choi | |
| 2015/0186097 | A1 | 7/2015 | Hall | |
| 2016/0133224 | A1* | 5/2016 | Nakajima | G09G 5/005 348/445 |
| 2017/0038928 | A1 | 2/2017 | Park et al. | |
| 2018/0061298 | A1 | 3/2018 | Cho et al. | |
| 2018/0090054 | A1* | 3/2018 | Zhang | G06F 3/1446 |
| 2019/0056903 | A1 | 2/2019 | Otsuka | |

FOREIGN PATENT DOCUMENTS

| | | | |
|---|---|---|---|
| JP | 2002-244633 | A | 8/2002 |
| JP | 2007-322814 | A | 12/2007 |
| JP | 2015-1549 | A | 1/2015 |
| KR | 10-0172330 | B1 | 3/1999 |
| KR | 10-2004-0005665 | A | 1/2004 |
| KR | 10-2005-0065396 | A | 6/2005 |
| KR | 10-0881142 | B1 | 2/2009 |
| KR | 10-2009-0038204 | A | 4/2009 |
| KR | 10-1723456 | B1 | 4/2017 |
| WO | 2015104814 | A1 | 7/2015 |
| WO | 2016/105068 | A1 | 6/2016 |
| WO | 2017/138171 | A1 | 8/2017 |

OTHER PUBLICATIONS

Communication dated Sep. 6, 2021, issued by the Korean Patent Office in counterpart Korean Application No. 10-2018-0068066.
Examination Report (issuance date: Nov. 22, 2022) issued by the European Patent Office for European Patent Application No. 19819105.8.
Office Action (issuance date: Dec. 20, 2022) issued by the Chinese Patent Office for Chinese Patent Application No. 201910427128.9.
Communication issued Jul. 25, 2022 by the European Patent Office for European Patent Application No. 22167030.0.
Office Action issued on Jun. 22, 2023 by the Chinese Patent Office in corresponding CN Patent Application No. 201910427128.9.
Communication issued on Jun. 10, 2024 by the European Patent Office for European Patent Application No. 22167030.0.
Communication issued on Jul. 5, 2024 by the European Patent Office for European Patent Application No. 19819105.8.
Communication issued on Sep. 3, 2024 by the European Patent Office for European Patent Application No. 22167030.0.
International Search Report (PCT/ISA/210) dated Aug. 22, 2019 issued by the International Searching Authority in International Application No. PCT/KR2019/005740.
Written Opinion (PCT/ISA/237) dated Aug. 22, 2019 issued by the International Searching Authority in International Application No. PCT/KR2019/005740.
Communication dated Jun. 2, 2020, from the Japanese Patent Office in Application No. 2019-109694.
Communication dated Mar. 10, 2021 issued by the European Patent Office in application No. 19819105.8.
Communication dated Mar. 24,2021 issued by the Korean Patent Office in application No. 10-2018-0068066 English Translation.

* cited by examiner

ELECTRONIC APPARATUS AND METHOD FOR CONTROLLING THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

[This application is based on and claims priority under 35 U.S.C. § 119(a) to Korean patent application number 10-2018-0068066, filed on Jun. 14, 2018, in the Korean Intellectual Property Office, the disclosure of which is incorporated by reference herein in its entirety.] *This application is a reissue of U.S. patent application Ser. No. 16/393,075, filed Apr. 24, 2019, and issued on Jun. 15, 2021 as U.S. Pat. No. 11,036,455 B2. The disclosure of U.S. patent application Ser. No. 16/393,075 is considered part of the disclosure of the instant application and is hereby incorporated by reference in its entirety.*

BACKGROUND

1. Field

The disclosure relates to an electronic apparatus and a controlling method thereof, and more particularly, to an electronic apparatus which transmits image signals to a display apparatus, and a controlling method thereof.

2. Description of Related Art

Recently, as electronic technologies are being developed more and more, various electronic apparatuses that suit the consumers' needs are being developed. In particular, large-size display apparatuses to which a plurality of display modules are connected are being developed recently.

A large-size display apparatus provides images by a method wherein an image signal is received from an external electronic apparatus through an interface of a display module arranged on a corner of the large-size display apparatus, and the received image signal is sequentially transmitted to another adjacent display module.

For example, in a case of a large-size display apparatus in a 2×2 arrangement wherein a first display module and a second display module are arranged from left to right on the upper side, and a third display module and a fourth display module are arranged from left to right on the lower side, the large-size display apparatus provides images by a method wherein the first display module transmits an image signal received from an external electronic apparatus to the adjacent second display module, and the second display module transmits the image signal received from the first display module to the fourth display module, and the fourth display module transmits the image signal received from the second display module to the third display module.

Meanwhile, in a case in which a large-size display apparatus is connected to an external electronic apparatus through an interface, the external electronic apparatus needs to include an interface having a channel bandwidth in a sufficient size, in order to transmit high quality images such as a 4 k image or a 8 k image.

However, there is a problem in which an interface of an external electronic apparatus such as a conventional set-top box that transmits images to a large-size display apparatus does not have a channel bandwidth in a sufficient size which enables transmission of high quality image signals.

SUMMARY

Additional aspects will be set forth in part in the description which follows and, in part, will be apparent from the description, or may be learned by practice of the presented embodiments.

In accordance with an aspect of the disclosure, there is provided an electronic apparatus including: an interface connected to a modular display apparatus; and a processor configured to divide a plurality of display modules included in the modular display apparatus into a plurality of groups based on a vertical direction; divide an image signal into a plurality of image signals corresponding to the plurality of groups; and transmit through the interface, the divided plurality of image signals to the plurality of groups.

The interface may include a plurality of ports connected to the modular display apparatus, and wherein the processor may be further configured to: divide the plurality of display modules into the plurality of groups based on a number of the plurality of ports connected to the modular display apparatus; and transmit the divided plurality of image signals to the plurality of groups through the plurality of ports.

The plurality of ports may be connected to the display modules located on an outer rim among the plurality of display modules belonging to the plurality of groups, and wherein the processor may be further configured to: transmit the divided plurality of image signals to the display modules located on the outer rim through the plurality of ports.

The processor may be further configured to: based on a new group being connected to at least one of the plurality of ports, divide the image signal based on the new group that is connected.

The image signal before division may be an image signal corresponding to a first channel bandwidth, wherein a channel bandwidth of the interface corresponds to a second channel bandwidth, which may be smaller than the first channel bandwidth, and wherein the processor may be further configured to: divide the image signal corresponding to the first channel bandwidth to correspond to the second channel bandwidth; and transmit the divided plurality of image signals to the plurality of groups.

The processor may be further configured to: encode the divided plurality of image signals corresponding to the plurality of groups in units of rows; and transmit the encoded image signals sequentially to the plurality of groups.

The processor may be further configured to: perform vertical synchronization on the divided plurality of image signals; and transmit the vertically synchronized image signals to the plurality of groups.

The processor may be further configured to: generate metadata including information about image quality of the divided plurality of image signals corresponding to the plurality of groups; and transmit the metadata to the plurality of groups with the divided plurality of image signals, and wherein the image quality of the divided plurality of image signals may be same as an image quality of the image signal before division.

In accordance with an aspect of the disclosure, there is provided a method for controlling an electronic apparatus, the method including: dividing a plurality of display modules included in a modular display apparatus into a plurality of groups based on a vertical direction; dividing an image signal into a plurality of image signals corresponding to the plurality of groups; and transmitting through the interface, the divided plurality of image signals to the plurality of groups.

The transmitting may include: dividing the plurality of display modules into the plurality of groups based on a number of a plurality of ports connected to the modular display apparatus; and transmitting the divided plurality of image signals to the plurality of groups through the plurality of ports.

The plurality of ports may be connected to the display modules located on an outer rim among the plurality of display modules belonging to the plurality of groups, and wherein the transmitting may include: transmitting the divided plurality of image signals to the display modules located on the outer rim through the plurality of ports.

The dividing may further include: based on a new group being connected to at least one of the plurality of ports, dividing the image signal based on the new group that is connected.

The image signal before division may be an image signal corresponding to a first channel bandwidth, wherein the channel bandwidth of an interface of the electronic apparatus corresponds to a second channel bandwidth, which may be smaller than the first channel bandwidth, and wherein the transmitting may further include: dividing the image signal corresponding to the first channel bandwidth to correspond to the second channel bandwidth; and transmitting the divided plurality of image signals to the plurality of groups.

The transmitting may further include: encoding the divided plurality of image signals corresponding to the plurality of groups in units of rows; and transmitting the encoded image signals sequentially to the plurality of groups.

The transmitting may further include: performing vertical synchronization on the divided plurality of image signals; and transmitting the vertically synchronized image signals to the plurality of groups.

The transmitting may further include: generating metadata including information about an image quality of the divided plurality of image signals corresponding to the plurality of groups; and transmitting the metadata to the plurality of groups with the divided plurality of image signals, and wherein the image quality of the divided plurality of image signals may be same as an image quality of the image signal before division.

In accordance with an aspect of the disclosure, there is provided a non-transitory computer readable medium having stored thereon one or more instructions which, when executed by a processor of an electronic apparatus, causes the electronic apparatus to perform operations, the operations including: dividing a plurality of display modules included in a modular display apparatus into a plurality of groups based on a vertical direction; dividing an image signal into a plurality of image signals corresponding to the plurality of groups; and transmitting through the interface, the divided plurality of image signals to the plurality of groups.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

First, as terms used in this specification and the claims, general terms were selected in consideration of the functions described in the disclosure. However, the terms may vary depending on the intention of those skilled in the art who work in the pertinent field, legal or technical interpretation, emergence of new technologies, and the like. Also, there are some terms that were designated by the applicant on his own, and in such cases, the meaning of the terms will be interpreted as defined in this specification. In case there is no specific definition of the terms, the meaning of the terms will be interpreted based on the overall content of this specification and common technical knowledge in the pertinent technical field.

Also, in case it is determined that in describing the disclosure, detailed explanation of related known technologies or functions may unnecessarily confuse the gist of the disclosure, the detailed explanation will be shortened or omitted.

Further, while embodiments of the disclosure are described in detail with reference to the following accompanying drawings and the content described in the accompanying drawings, it is not intended that the disclosure is restricted or limited by the embodiments.

Hereinafter, the disclosure will be described in detail with reference to the accompanying drawings.

Aspects of the disclosure address the above-mentioned problem. Accordingly, the disclosure is aimed at enabling a large-size display apparatus to display high quality images even through an electronic apparatus having a small channel bandwidth.

According to various embodiments, high quality images can be provided even through an electronic apparatus having a low specification interface.

Figure 1A:
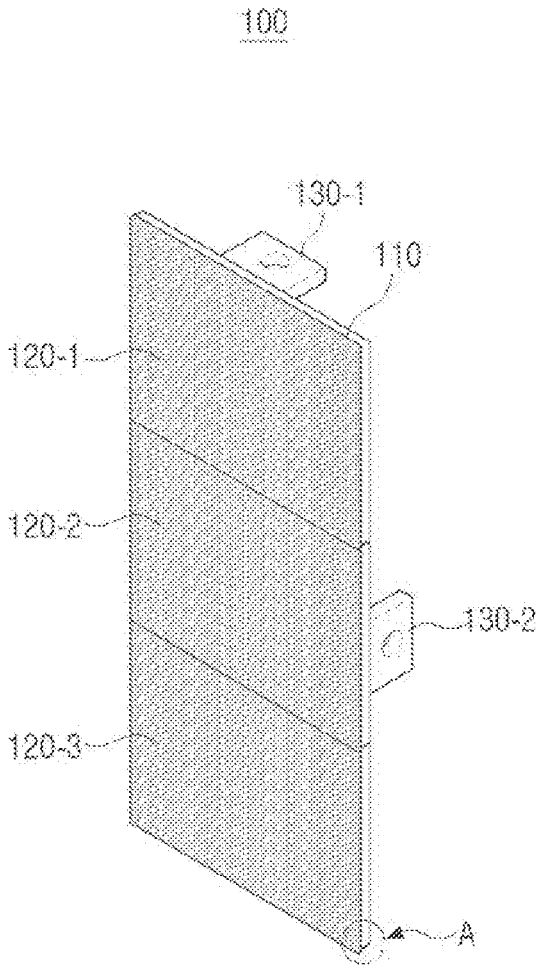
FIG. 1A is a diagram for illustrating a display apparatus according to an embodiment.
Figure 1B:
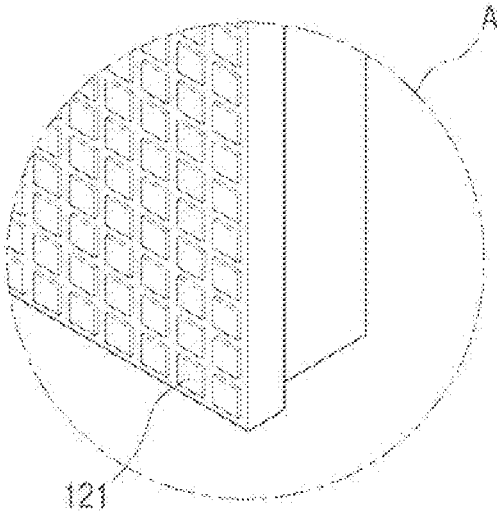
FIG. 1B is a diagram for illustrating a display apparatus according to an embodiment.
Figure 1C:
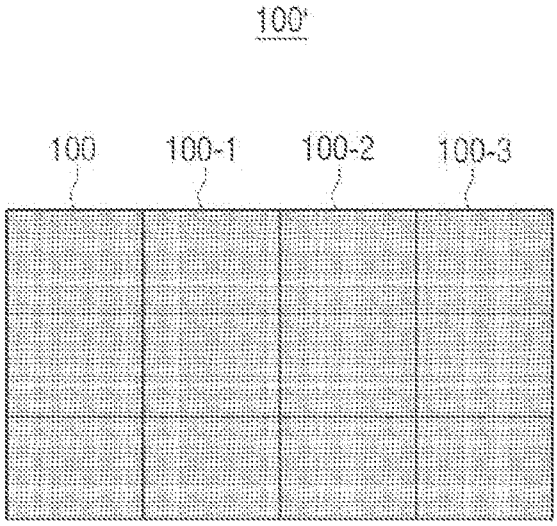
FIG. 1C is a diagram for illustrating a display apparatus according to an embodiment.

FIGS. 1A to 1C are diagrams for illustrating a display apparatus according to an embodiment.

Referring to FIG. 1A, a display apparatus 100 according to an embodiment may include a cabinet 110 and a plurality of display modules 120-1, 120-2, 120-3 arranged on the cabinet. That is, the display apparatus 100 may be implemented as a modular display apparatus wherein a plurality of display modules 120-1, 120-2, 120-3 are physically connected.

Here, each of the plurality of display modules 120-1, 120-2, 120-3 may be implemented as a LED display module including light emitting diodes (LEDs). Additionally, Portion A highlights a lower right portion of the display apparatus, which is enlarged in FIG. 1B.

To be specific, referring to FIG. 1B, which illustrates the enlarged portion A from FIG. 1A, each of the plurality of display modules 120-1, 120-2, 120-3 may be implemented as a LED display module including a plurality of LEDs 121 wherein a red LED, a green LED, and a blue LED which are subpixels are implemented as one pixel.

Here, the plurality of pixels may be arranged in the form of a matrix (e.g., M×N, and here, M and N are natural numbers). To be specific, the matrix may be in the form of an arrangement of identical numbers (e.g., M=N, and here, M and N are natural numbers, such as a 16×16 arrangement, a 24×24 arrangement, and the like), and it may also be in the form of an arrangement of different numbers (e.g., M≠N, and here, M and N are natural numbers).

Meanwhile, the LED of a LED display module according to an embodiment may be implemented as a micro LED. Here, a micro LED means a LED which is in a size of approximately 5~100 micrometers, and is a micro light emitting diode which emits light by itself without a color filter.

As a LED display module is constituted as a micro LED, the modular display apparatus 100 according to an embodiment may be implemented in a bezeless form, and in displaying an image, the modular display apparatus 100 may display a seamless image without discontinuity among cabinets.

However, a LED display module as described above is just an example, and a display module may also be implemented as an organic LED (OLED), an active-matrix OLED (AMOLED), a plasma display panel (PDP), and the like. Hereinafter, for the convenience of explanation, a display module according to an embodiment will be explained based on the assumption that it is a LED display module.

Referring to FIG. 1A again, the display apparatus 100 according to an embodiment may be implemented in a form wherein the plurality of display modules 120-1, 120-2, 120-3 are coupled in a 1×3 arrangement. That is, a plurality of display modules included in a cabinet 110 may be arranged in a vertical direction.

Meanwhile, a LED display module in a 1×3 arrangement as described above is just an example, and the form of arrangement and the number of display modules of a LED display module may be modified in various ways.

The cabinet (110) may include a base plate on which each of the plurality of display modules 120-1, 120-2, 120-3 can be mounted. Here, the base plate may be implemented in a form wherein each of the display modules can be mounted on the front surface of the base plate.

Meanwhile, the display apparatus 100 according to an embodiment may include a plurality of coupling parts 130-1, 130-2 that can be coupled with another display apparatus. Accordingly, the display apparatus 100 according to an embodiment may be implemented as a large-size display apparatus through coupling with another display apparatus.

For example, referring to FIG. 1C, the display apparatus 100 according to an embodiment may be implemented as a large-size display apparatus 100' such as a video wall, as it is coupled with a plurality of other display apparatuses 100-1, 100-2, 100-3 in a 4×1 arrangement. Meanwhile, a large-size display apparatus in a 4×1 arrangement as described above is just an example, and the form of arrangement and the number of display modules of a large-size display apparatus may be modified in various ways.

Meanwhile, the display apparatus 100 may display various images by operating a plurality of LEDs.

To be specific, when image signals are received from an external apparatus, the display apparatus 100 may generate image signals corresponding to the location of each LED display module 120-1, 120-2, 120-3.

Then, the display apparatus 100 may transmit image signals to each of the plurality of display modules 120-1, 120-2, 120-3, which correspond to the location of each display module.

Afterwards, each of the LED display modules may operate (e.g., turn on, turn off, or flicker) LEDs in a corresponding way to the received image signal. Accordingly, the display apparatus 100 may display various images through the LED display modules.

Figure 2:
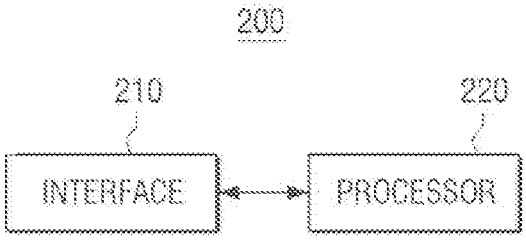
FIG. 2 is a block diagram for illustrating an electronic apparatus according to an embodiment.

FIG. 2 is a block diagram for illustrating an electronic apparatus according to an embodiment.

Referring to FIG. 2, an electronic apparatus 200 according to an embodiment includes an interface 210 and a processor 220. Hereinafter, for the convenience of explanation, the electronic apparatus 200 will be explained with reference to FIGS. 3 and 4.

The interface 210 may be connected to the modular display apparatus (100). Here, the modular display apparatus 100 may be a display apparatus wherein a plurality of display modules 120-1, 120-2, 120-3 are physically connected.

The interface 210 may be connected to the modular display apparatus 100 through a port. To be specific, the interface 210 may be connected to the modular display apparatus 100 through a cable connected to the port. Here, the cable may be a high definition multimedia interface (HDMI) cable.

However, this is just an example, and the cable may also be a digital visual interface (DVI) cable, or a low voltage differential signals (LVDS) cable. Also, the cable may be an optical cable.

Further, the interface 210 may also be connected to the modular display apparatus 100 through wireless communication. In this case, the interface 210 may include a WiFi chip, a Bluetooth chip, or a wireless communication chip, and the like.

Meanwhile, the modular display apparatus 100 may be implemented as a large-size display apparatus 100' such as a video wall, to which a plurality of display apparatuses 100, 100-1, 100-2, 100-3 are coupled.

In this case, the interface 210 may be connected to the modular display apparatus 100 through each of a plurality of ports.

Figure 3:
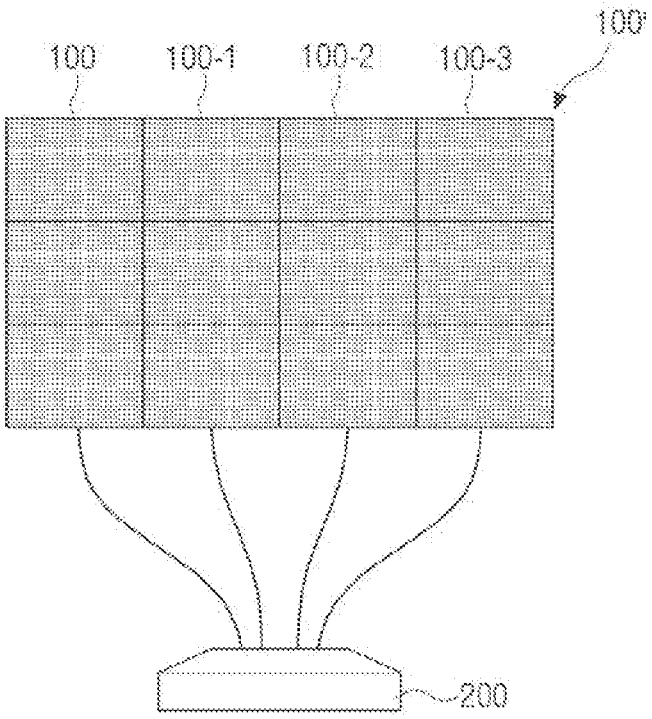
FIG. 3 is a diagram for illustrating an operation in a case in which a plurality of display apparatuses are connected to an electronic apparatus according to an embodiment.

For example, as illustrated in FIG. 3, in a case in which a plurality of display apparatuses 100, 100-1, 100-2, 100-3 are coupled in a 4×1 arrangement, the interface 210 may be connected to each display apparatus through each of a plurality of ports. For this, the interface 210 may include at least four ports which can be connected to each of the plurality of display apparatuses 100, 100-1, 100-2, 100-3.

That is, the interface 210 may include a first port connected to the first display apparatus 100, a second port connected to the second display apparatus 100-1, a third port connected to the third display apparatus 100-2, and a fourth port connected to the fourth display apparatus 100-3.

Meanwhile, the number of ports as described above is just an example, and the number of ports can obviously increase according to embodiments.

The processor 220 controls overall operations of the electronic apparatus 200. For this, the processor 220 may include one or more of a central processing unit (CPU), an application processor (AP), or a communication processor (CP).

The processor 220 may transmit an image signal to the modular display apparatus 100 through the interface 210.

To be specific, the processor 220 may transmit an image signal received from an external apparatus or an image stored in a storage to the modular display apparatus 100 through the interface 210. Here, the external apparatus may be a server, a set-top box, a USB storage, a PC, a smartphone, and the like.

Meanwhile, as described above, the modular display apparatus 100 may be implemented as a large-size display apparatus 100' such as a video wall, to which a plurality of display apparatuses 100, 100-1, 100-2, 100-3 are coupled.

Hereinafter, for the convenience of explanation, the modular display apparatus 100 will be explained based on the assumption that it is a large-size display apparatus 100' to which a plurality of display apparatuses 100, 100-1, 100-2, 100-3 are coupled.

In this case, the processor 220 may divide a plurality of display modules included in the modular display apparatus 100 into a plurality of groups based on a vertical direction.

To be specific, the processor 220 may divide a plurality of display modules into a plurality of groups based on a vertical direction, based on the number of ports connected to the modular display apparatus 100.

For example, as illustrated in FIG. 3, in a case in which a first display apparatus 100 is connected through a first port, a second display apparatus 100-1 is connected through a second port, a third display apparatus 100-2 is connected through a third port, and a fourth display apparatus 100-3 is connected through a fourth port, the processor 220 may divide a plurality of display modules into four groups.

Here, the first group may be a plurality of display modules included in the first display apparatus 100, the second group may be a plurality of display modules included in the second display apparatus 100-1, the third group may be a plurality of display modules included in the third display apparatus 100-2, and the fourth group may be a plurality of display modules included in the fourth display apparatus 100-3.

Then, the processor 220 may divide an image signal into image signals corresponding to each of the plurality of groups. To be specific, the processor 220) may divide an image corresponding to an image signal into images corresponding to each of the plurality of groups. That is, divided image signals mean signals corresponding to divided images. Also, in the divided image signals, the image frames of the image signals may be divided based on the location and the number of each group.

For example, in a case in which the four display apparatuses 100, 100-1, 100-2, 100-3 are connected from left to right and implemented as a modular display apparatus 100', as illustrated in FIG. 3, the processor 220 may divide the image frames of an image signal into four equal parts from left to right.

Here, the processor 220 may divide the image frames of an image signal based on the size of each of the plurality of groups.

For example, in a case in which the size of each display apparatus 100, 100-1, 100-2, 100-3 is 1 m in width and 2 m in length, the processor 220 may divide the image frames of an image signal into four image frames of which width to length ratio is 1:2.

Then, the processor 220 may transmit the divided image signals to each of the plurality of groups through each of the plurality of ports. That is, the processor 220 may transmit image signals corresponding to each of the divided images to each of the plurality of groups through each of the plurality of ports.

To be specific, the processor 220 may encode the divided image signals corresponding to each of the plurality of groups in units of rows, and sequentially transmit the image signals encoded in units of rows to each of the plurality of groups.

Figure 4:
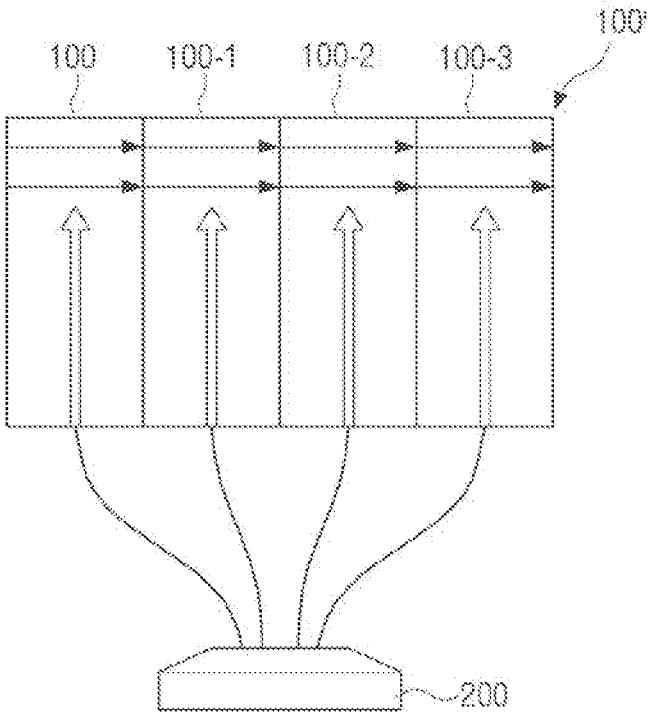
FIG. 4 is a diagram for illustrating an operation of an electronic apparatus according to an embodiment of transmitting an image signal to a plurality of groups.

For example, as illustrated in FIG. 4, the processor 220 may sequentially transmit the image signals encoded in units of rows to each of the plurality of groups.

A process of processing a signal by the modular display apparatus 100 related to the above process will be described in more detail with reference to FIG. 5.

Meanwhile, the bandwidth of the divided image signals as described above may correspond to the channel bandwidth of the interface 210.

To be specific, in a case in which the bandwidth of an image signal before division is a first channel bandwidth, and the channel bandwidth of the interface is a second channel bandwidth which is smaller than the first channel bandwidth, the processor 220 may divide an image signal corresponding to the first channel bandwidth to correspond to the second channel bandwidth.

By dividing an image signal to correspond to the channel bandwidth of the interface 210, the electronic apparatus 200 according to an embodiment has an effect of providing high quality images even through a low specification interface.

To be specific, a conventional electronic apparatus has a problem that, in a case in which an image signal having a bandwidth which is bigger than the channel bandwidth of the interface is received, a high quality image signal cannot be processed due to the difference in the bandwidth.

In contrast, the electronic apparatus 200 according to an embodiment divides an image signal to correspond to the channel bandwidth of the interface 210, and accordingly, the electronic apparatus 200 can transmit a high quality image signal to each group of the modular display apparatus, and thus the electronic apparatus 200 can provide a high quality image to a user without degradation in the image quality.

Meanwhile, the processor 220 may perform vertical synchronization (V-sync) on the aforementioned divided image signals, and transmit the vertically synchronized image signals to each of the plurality of groups.

To be specific, the processor 220 may perform vertical synchronization (V-sync) on each of the divided image signals and transmit the vertically synchronized image signals to each of the plurality of groups, so that the same image frame can be displayed at the same timing when each of the plurality of groups displays an image corresponding to a received image signal.

Meanwhile, the processor 220 may generate respective metadata including information on the image quality of the image signals corresponding to each of the plurality of groups. That is, the processor 220 may generate metadata including information on the image quality for each group.

Here, the image quality of the image signals corresponding to each of the plurality of groups may be the same as the image quality of the image signals before division.

For example, in a case in which the image quality of the image signals before division is 8 k, the image quality of the image signals after division may also be 8 k.

For this, the processor 220 may identify the image quality of the image signals before division based on the information on the image quality included in the image signals before division. Also, the processor 220 may generate metadata including information on the same image quality as the image quality of the image signals before division for each group.

Afterwards, the processor 220 may transmit the respective metadata to each of the plurality of groups with the divided image signals.

Accordingly, the modular display apparatus 100 may operate the LEDs included in the display modules according to the metadata including information on the image quality.

To be specific, when operating the LEDs included in the display modules, the modular display apparatus 100 may display an image while adjusting the brightness values of each of the red LED, the green LED, and the blue LED according to the metadata including information on the image quality. In a case in which the image quality of an image signal before division is 8 k, as in the aforementioned embodiment, the image quality of an image displayed by the modular display apparatus 100 may also be 8 k.

Figure 5:
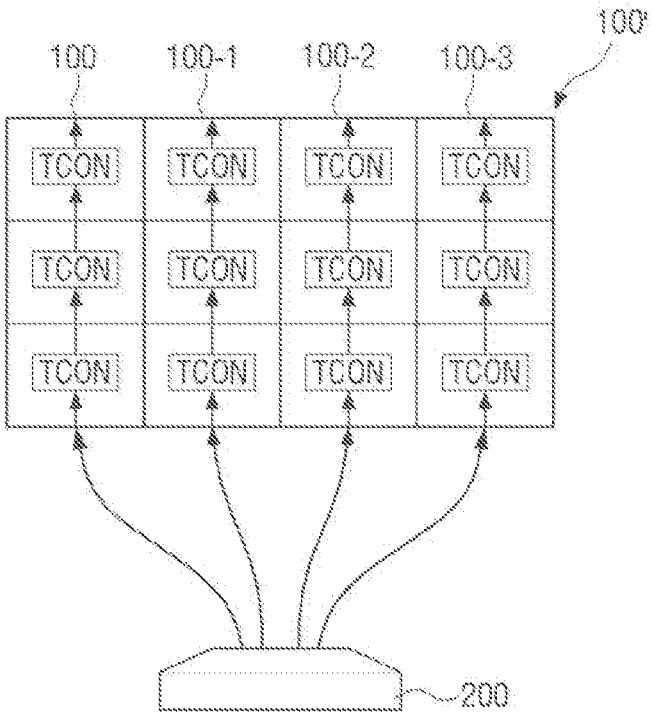
FIG. 5 is a diagram for illustrating a method of processing a signal by a modular display apparatus according to an embodiment.

FIG. 5 is a diagram for illustrating a method of processing a signal by a modular display apparatus according to an embodiment.

Each of the plurality of ports of the electronic apparatus 200 may be connected to each of the display modules located on the outer rim among the display modules belonging to each of the plurality of groups. For example, referring to FIG. 5, each of the plurality of ports may be connected to each of the display modules located in the lower part among the display modules belonging to each of the plurality of groups.

Accordingly, the processor 220 may transmit the divided image signals to each of the display modules located in the lower part among the plurality of display modules belonging to each group through each of the plurality of ports.

In this case, each of the display modules located in the lower part may transmit the divided image signals received from the electronic apparatus 200 to the display modules located in the upper part.

To be specific, the plurality of display modules included in each group may be connected to one another in a daisy-chain manner, and the display modules located in the lower part may transmit the divided image signals to the display modules located in the upper part.

When the divided image signals are transmitted to a display module located in the uppermost part in a manner as described above, the display module located in the uppermost part may decode the received image signals through a timing controller (TCON), and reproduce images.

Also, a display module located below the display module located in the uppermost part may also decode the received image signals through a timing controller (TCON), and reproduce images in the same manner, when the divided image signals are transmitted.

Meanwhile, signal processing as described above may be performed simultaneously in each of the plurality of groups. That is, unlike a conventional display apparatus which processes image signals while setting the upper left part to the upper right part of the display apparatus as one line, the modular display apparatus 100 according to an embodiment receives divided image signals from the electronic apparatus 200, and accordingly, each of the plurality of groups may simultaneously decode the received image signals and reproduce images.

Figure 6:
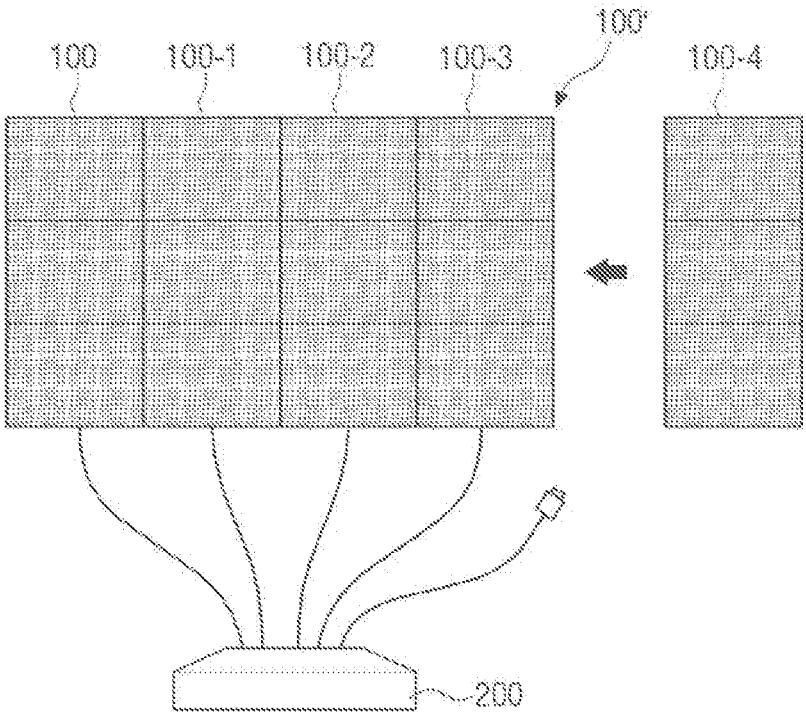
FIG. 6 is a diagram for illustrating an operation of an electronic apparatus in a case in which a new display apparatus is connected to a modular display apparatus according to an embodiment.

FIG. 6 is a diagram for illustrating an operation of an electronic apparatus in a case in which a new display apparatus is connected to a modular display apparatus according to an embodiment.

As described above, the display apparatus 100 according to an embodiment may include a plurality of coupling parts 130-1, 130-2 that can be coupled with another display apparatus.

Accordingly, the display apparatus 100 according to an embodiment may be implemented as a large-size display apparatus through coupling with another display apparatus.

Meanwhile, as illustrated in FIG. 6, in a case in which a new display apparatus 100-4 is coupled with the modular display apparatus 100, the electronic apparatus 200 may divide image signals in further consideration of the newly connected display apparatus 100-4.

To be specific, in a case in which a new display apparatus is coupled to at least one of the plurality of ports, the processor 220 may identify the newly coupled display apparatus as a new group.

Then, the processor 220 may divide image signals in further consideration of the newly coupled group.

For example, referring to FIG. 6, in a case in which a new group is connected through a port of the electronic apparatus 200, the processor 220 may divide an image signal that was previously divided into four equal parts into five equal parts, and transmit the divided image signals to each of the plurality of groups. That is, the processor 220 may divide an image corresponding to an image signal into five equal parts, and transmit image signals corresponding to each of the divided images to each of the plurality of groups.

As described above, if a new display apparatus is connected to a port of the electronic apparatus 200, an image signal is divided to correspond to the number of the groups. Accordingly, the electronic apparatus 200 according to an embodiment of the disclosure can easily extend the size of a screen.

Figure 7:
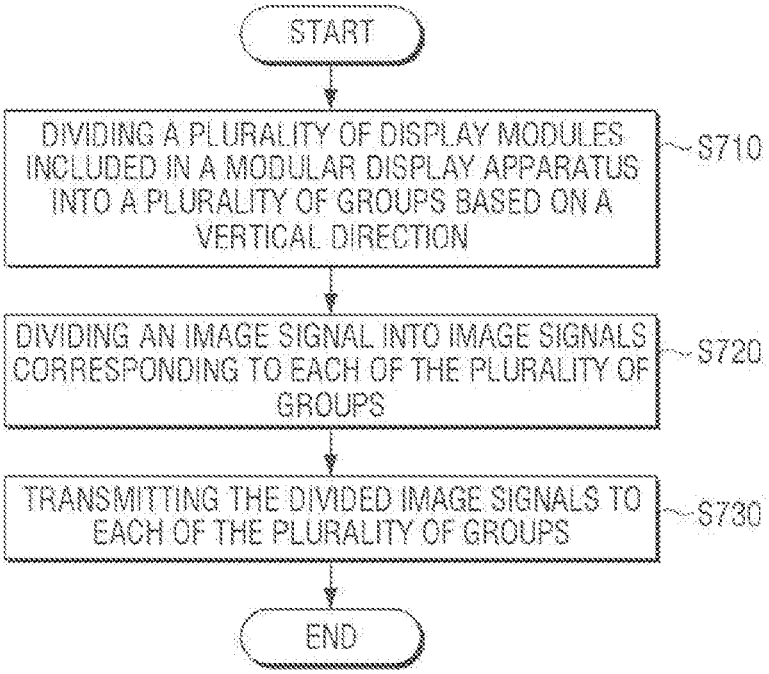
FIG. 7 is a flow chart for illustrating an operation of an electronic apparatus according to an embodiment.

FIG. 7 is a flow chart for illustrating an operation of an electronic apparatus according to an embodiment of the disclosure.

An electronic apparatus according to an embodiment of the disclosure may transmit an image signal to a modular display apparatus.

For this, the electronic apparatus may first divide a plurality of display modules included in the modular display apparatus into a plurality of groups based on a vertical direction in step S710.

To be specific, the electronic apparatus may divide the plurality of display modules into the plurality of groups based on the number of a plurality of ports connected to the modular display apparatus.

Then, the electronic apparatus may divide an image signal into image signals corresponding to each of the plurality of groups in step S720.

To be specific, the electronic apparatus may divide the image signal to correspond to the number of the plurality of ports.

Then, the electronic apparatus may transmit the divided image signals to each of the plurality of groups in step S730.

Accordingly, the modular display apparatus may receive the image signals divided in a vertical direction, and display images by using the received image signals.

Meanwhile, a non-transitory computer readable medium storing a program that sequentially performs a method for controlling an electronic apparatus according to the disclosure may be provided.

A non-transitory computer readable medium refers to a medium that stores data semi-permanently, and is readable by machines, but not a medium that stores data for a short moment such as a register, a cache, and memory. To be specific, the aforementioned various applications or programs may be provided while being stored in a non-transitory computer-readable medium such as a CD, a DVD, a hard disc, a blue-ray disc, a USB, a memory card, a ROM and the like.

Also, while preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are not to be interpreted independently from the technical idea or prospect of the disclosure.

What is claimed is:

1. An electronic apparatus comprising:

an interface connected to a modular display apparatus, the modular display apparatus comprising a plurality of display modules; and

[a processor] *one or more processors* connected to the interface, [the processor configured to:]

*wherein the one or more processors are configured to:*

[divide] *identify* the plurality of display modules [into] *as* a plurality of groups *into which the plurality of display modules are divided* in a vertical direction, each of the plurality of groups comprising at least two display modules from among the plurality of display modules and the at least two display modules being connected to one another in a daisy-chain manner in the vertical direction[;], divide an image signal corresponding to a first channel bandwidth into a plurality of image signals respectively corresponding to a second channel bandwidth and the plurality of groups based on a number of the plurality of groups and each location of the plurality of groups, wherein the second channel bandwidth corresponds to a channel bandwidth of the interface that is smaller than the first channel bandwidth[;], and transmit through the interface, the plurality of image signals to the plurality of groups, wherein each of [the] display modules located at a bottom among the at least two display modules included in the plurality of groups is connected to the interface, and wherein each of the divided plurality of image signals is transmitted from the each of the display modules located at the bottom among the at least two display modules to other display modules located in an upper part in the vertical direction.

2. The electronic apparatus of claim 1, wherein the interface comprises a plurality of ports connected to the modular display apparatus, [and]

[wherein the processor is further configured to:]

[divide] *wherein* the plurality of display modules *are divided* into the plurality of groups based on a number of the plurality of ports connected to the modular display apparatus[;], and

*wherein the one or more processors are further configured to* transmit the plurality of image signals to the plurality of groups through the plurality of ports.

3. The electronic apparatus of claim 2, wherein the plurality of ports [is] *are* connected to [the] display modules located on an outer rim among the plurality of display modules belonging to the plurality of groups, and wherein the [processor is] *one or more processors are* further configured to:

transmit the plurality of image signals to the display modules located on the outer rim through the plurality of ports.

4. The electronic apparatus of claim 2, wherein the [processor is] *one or more processors are* further configured to:

based on a new group being connected to at least one of the plurality of ports, divide the image signal based on the new group that is connected.

5. The electronic apparatus of claim 1, wherein the [processor is] *one or more processors are* further configured to:

encode the plurality of image signals corresponding to the plurality of groups in units of rows; and transmit the encoded image signals sequentially to the plurality of groups.

6. The electronic apparatus of claim 1, wherein the [processor is] *one or more processors are* further configured to:

perform vertical synchronization on the plurality of image signals; and transmit the vertically synchronized image signals to the plurality of groups.

7. The electronic apparatus of claim 6, wherein the [processor is] *one or more processors are* further configured to:

generate metadata comprising information about *an* image quality of the plurality of image signals corresponding to the plurality of groups; and transmit the metadata to the plurality of groups with the plurality of image signals, and wherein the image quality of the plurality of image signals is same as an image quality of the image signal before division.

[8. The electronic apparatus of claim 1, wherein a number of the plurality of image signals equals a number of the plurality of groups.]

[9. A method for controlling an electronic apparatus, the method comprising:

dividing a plurality of display modules included in a modular display apparatus into a plurality of groups in a vertical direction, each of the plurality of groups comprising at least two display modules from among the plurality of display modules and the at least two display modules being connected to one another in a daisy-chain manner in the vertical direction;

dividing an image signal corresponding to a first channel bandwidth into a plurality of image signals respectively corresponding to a second channel bandwidth and the plurality of groups based on a number of the plurality of groups and each location of the plurality of groups, wherein the second channel bandwidth corresponds to a channel bandwidth of an interface of the electronic apparatus that is smaller than the first channel bandwidth; and transmitting through the interface, the plurality of image signals to the plurality of groups, wherein each of the display modules located at a bottom among the at least two display modules included in the plurality of groups is connected to the interface, and wherein each of the divided plurality of image signals is transmitted from the each of the display modules located at the bottom among the at least two display modules to other display modules located in an upper part in the vertical direction.]

[10. The method for controlling the electronic apparatus of claim 9, wherein the transmitting further comprises:

dividing the plurality of display modules into the plurality of groups based on a number of a plurality of ports connected to the modular display apparatus; and transmitting the plurality of image signals to the plurality of groups through the plurality of ports.]

[11. The method for controlling the electronic apparatus of claim 10, wherein the plurality of ports is connected to the display modules located on an outer rim among the plurality of display modules belonging to the plurality of groups, and wherein the transmitting further comprises:

transmitting the plurality of image signals to the display modules located on the outer rim through the plurality of ports.]

[12. The method for controlling the electronic apparatus of claim 10, wherein the dividing further comprises:

based on a new group being connected to at least one of the plurality of ports, dividing the image signal based on the new group that is connected.]

[13. The method for controlling the electronic apparatus of claim 9, wherein the transmitting further comprises:

encoding the plurality of image signals corresponding to the plurality of groups in units of rows; and transmitting the encoded image signals sequentially to the plurality of groups.]

[14. The method for controlling the electronic apparatus of claim 9, wherein the transmitting further comprises:

performing vertical synchronization on the plurality of image signals; and transmitting the vertically synchronized image signals to the plurality of groups.]

[15. The method for controlling the electronic apparatus of claim 14, wherein the transmitting further comprises:

generating metadata comprising information about an image quality of the plurality of image signals corresponding to the plurality of groups; and transmitting the metadata to the plurality of groups with the plurality of image signals, and wherein the image quality of the plurality of image signals is same as an image quality of the image signal before division.]

[16. The method for controlling the electronic apparatus of claim 9, wherein a number of the plurality of image signals equals a number of the plurality of groups.]

[17. A non-transitory computer readable medium having stored thereon one or more instructions which, when executed by a processor of an electronic apparatus, causes the electronic apparatus to perform operations, the operations comprising:

dividing a plurality of display modules included in a modular display apparatus into a plurality of groups in a vertical direction, each of the plurality of groups comprising at least two display modules from among the plurality of display modules and the at least two display modules being connected to one another in a daisy-chain manner in the vertical direction;

dividing an image signal corresponding to a first channel bandwidth into a plurality of image signals respectively corresponding to a second channel bandwidth and the plurality of groups based on a number of the plurality of groups and each location of the plurality of groups, wherein the second channel bandwidth corresponds to a channel bandwidth of an interface of the electronic apparatus that is smaller than the first channel bandwidth; and transmitting through the interface, the plurality of image signals to the plurality of groups, wherein each of the display modules located at a bottom among the at least two display modules included in the plurality of groups is connected to the interface, and wherein each of the divided plurality of image signals is transmitted from the each of the display modules located at the bottom among the at least two display modules to other display modules located in an upper part in the vertical direction.]

[18. The non-transitory computer readable medium of claim 17, wherein a number of the plurality of image signals equals a number of the plurality of groups.]

*19. An electronic apparatus comprising:*

*an interface connected to a modular display apparatus comprising a plurality of display modules, wherein the plurality of display modules are divided into a plurality of groups in a vertical direction, and*

*one or more processors configured to:*

*divide an image signal corresponding to a first channel bandwidth into a plurality of image signals respectively corresponding to the plurality of groups based on a number of the plurality of groups and locations of the plurality of groups, each of the plurality of image signals corresponding to a second channel bandwidth that is smaller than the first channel bandwidth, and*

*transmit, through the interface, the plurality of image signals to display modules located at a bottom of the plurality of groups, each of the plurality of groups comprising at least two display modules,*

*wherein the display modules located at the bottom of the plurality of groups, to which the plurality of image signals are transmitted, are configured to communicate with other display modules located in an upper part above the display modules located at the bottom of the plurality of groups, in the vertical direction, and*

*wherein the at least two display modules are connected in a daisy-chain manner in the vertical direction.*

*20. The electronic apparatus of claim 19,*

*wherein the interface comprises a plurality of ports connected to the modular display apparatus,*

*wherein the plurality of display modules are divided into the plurality of groups based on a number of the plurality of ports connected to the modular display apparatus, and*

*wherein the one or more processors is further configured to transmit, through the plurality of ports, the plurality of image signals to the plurality of groups.*

*21. The electronic apparatus of claim 20,*

*wherein each of the plurality of ports is connected to a display module located on an outer rim among the at least two display modules of the each of the plurality of groups, and*

*wherein the one or more processors is further configured to:*

*transmit, through the plurality of ports, the plurality of image signals to display modules located on the outer rim among the plurality of display modules.*

*22. The electronic apparatus of claim 20, wherein the one or more processors is further configured to:*

*based on a new group including a least two display modules being connected to a port of the plurality of ports, divide the image signal based on the new group that is connected.*

*23. The electronic apparatus of claim 19, wherein the one or more processors is further configured to:*

*perform vertical synchronization on the plurality of image signals; and*

*transmit the vertically synchronized image signals to the plurality of groups.*

*24. The electronic apparatus of claim 23, wherein the one or more processors is further configured to:*

*generate metadata comprising information about image quality of the plurality of image signals corresponding to the plurality of groups; and*

*transmit the metadata to the plurality of groups with the plurality of image signals, wherein the image quality of the plurality of image signals is a same as an image quality of the image signal before division.*

*25. The electronic apparatus of claim 19, wherein the interface is connected to the modular display apparatus via a plurality of cables.*

*26. A method for controlling an electronic apparatus including an interface connected to a modular display apparatus including a plurality of display modules, wherein the plurality of display modules are divided into a plurality of groups in a vertical direction,*

*wherein the method comprises:*

*dividing an image signal corresponding to a first channel bandwidth into a plurality of image signals respectively corresponding to the plurality of groups based on a number of the plurality of groups and locations of the plurality of groups, each of the plurality of image signals corresponding to a second channel bandwidth that is smaller than the first channel bandwidth, and*

*transmitting through the interface, the plurality of image signals to display modules located at a bottom of the plurality of groups, each of the plurality of groups including at least two display modules,*

*wherein the display modules located at the bottom of the plurality of groups, to which the plurality of image signals are transmitted, are configured to communicate with other display modules located in an upper part above the display modules located at the bottom of the plurality of groups, in the vertical direction, and*

*wherein the at least two display modules are connected in a daisy-chain manner in the vertical direction.*

*27. The method of claim 26,*

*wherein the interface includes a plurality of ports connected to the modular display apparatus,*

*wherein the plurality of display modules are divided into the plurality of groups based on a number of the plurality of ports connected to the modular display apparatus, and*

*wherein the transmitting comprises transmitting, through the plurality of ports, the plurality of image signals to the plurality of groups.*

*28. The method of claim 27,*

*wherein each of the plurality of ports is connected to a display module located on an outer rim among the at least two display modules of the each of the plurality of groups, and*

*wherein the transmitting comprises transmitting through the plurality of ports, the plurality of image signals to display modules located on the outer rim among the plurality of display modules.*

*29. The method of claim 26, wherein the transmitting further comprises:*

*encoding the plurality of image signals corresponding to the plurality of groups in units of rows; and*

*transmitting the encoded image signals sequentially to the plurality of groups.*

*30. The method of claim 26, wherein the transmitting further comprises:*

*performing vertical synchronization on the plurality of image signals; and*

*transmitting the vertically synchronized image signals to the plurality of groups.*

*31. The method of claim 30, wherein the transmitting further comprises:*

*generating metadata including information about image quality of the plurality of image signals corresponding to the plurality of groups; and*

*transmitting the metadata to the plurality of groups with the plurality of image signals, and*

*wherein the image quality of the plurality of image signals is a same as an image quality of the image signal before division.*

* * * * *